United States Patent Office 3,788,880
Patented Jan. 29, 1974

3,788,880
METHOD OF INHIBITING CORROSION OF METAL SURFACES
Ewald Mensenkamp, Rheinhausen, and Phil Heinrich Cordes, Wolfenbutel, Germany, assignors to Stahlwerke Peine-Salzgitter AG, Gerhardstrasse, Germany
No Drawing. Filed Jan. 20, 1972, Ser. No. 219,520
Claims priority, application Germany, Jan. 26, 1971, P 21 03 342.1
Int. Cl. B44d 1/14
U.S. Cl. 117—70 S
10 Claims

ABSTRACT OF THE DISCLOSURE

A metal surface, e.g. of brass, is coated with a precipitate of a corrosion-retarding inorganic salt (e.g. a calcite) from water (preferably ordinary utility water containing the salt and under the electrochemical effect of local polarity differences along the metal body), whereupon the corrosion-inhibiting layer is used to bond, by ion-exchange interaction, an ion-exchange substance to the surface. Together, the corrosion-inhibiting and ion-exchange substances (a zeolite, natural or synthetic) form a three-dimensional stable coating which is adherent and prevents localized corrosion.

(1) FIELD OF THE INVENTION

Our present invention relates to corrosion-retarding layers as are applied to metal surfaces, metal bodies coated with corrosion-resistant layers and to a method of inhibiting corrosion at a metal surface; more particularly, the invention relates to a method of providing a stable corrosion-inhibiting coating upon a metallic surface and to the product formed by this method.

(2) BACKGROUND OF THE INVENTION

Numerous techniques have been proposed in the field of corrosion retardation, especially for metals such as brass which may be used in corrosive environments, e.g. refrigeration or heat-exchange systems in contact with a liquid or other environment in which galvanic and other corrosion processes are commonplace. For example, the metal surface may simply be coated with a lacquer, paint or the like which operates by interposing a fluid-impermeable barrier between the corrosive environment and the metal surface. Once the barrier is penetrated, however, corrosion proceeds beneath the barrier and the latter has little inhibiting effect. It is possible to laminate a corrodible surface with a corrosion-resistant metal, e.g. a relatively passive metal alloy, such as stainless steel, or to coat the corrodible surface with a noble metal. Both of these techniques are too expensive for most technological applications. It is also customary to provide sacrificial coatings or bodies upon or in the region of the corrodible surface and to apply so-called sacrificial coatings to the surface which have a corrosion potential such that galvanic corrosion is inhibited. These techniques likewise are expensive, difficult to carry out with many metals, and of only limited value with respect to certain corrosive environments.

We also might mention the fact that certain metals, e.g. aluminum, develop so-called self-healing corrosion-resistant coatings autonomously, i.e. without any special treatment. For example, when a fresh surface of metallic aluminum is exposed to an atmospheric environment, it is rapidly oxidized, the oxide coating inhibiting further corrosion. While this type of corrosion retardation is perhaps the best for many applications, it is limited in effect to a few metals and cannot even be induced in most of the common metals, such as those used for heat-exchanger tubing.

It has been proposed heretofore to inhibit corrosion upon a metal surface by inducing calcium carbonate to precipitate upon the surface of the metal, e.g. brass. The calcium carbonate can precipitate from ordinary utility water containing the calcium ion by virtue of local electrochemical effects produced by the different electrical potentials along the metal surface. When calcium carbonate is deposited, it is desirable that the bicarbonate-carbonate equilibrium should be shifted so that the calcium carbonate is deposited primarily in the form of calcite which, although effective as a corrosion inhibitor and adherent to the metal surface, form a coating lacking in internal cohesion, and has a tendency to form only in localized regions or to be stable only in localized regions whereby local corrosion of the pitting type can continue. This localized pitting corrosion is especially pronounced and undesirable when the metal surface is inhomogeneous because of the differing local potentials across the surface, especially when the surface is in contact with an electrically conductive liquid.

Efforts to stabilize the calcium carbonate deposit by including other low-solubility substances in the liquid have proved ineffective as have systems in which other low-solubility compounds were substituted for the calcium carbonate. In all cases in which efforts have been made to precipitate low-solubility inorganic compounds on metallic substrates, such as brass, as corrosion-inhibiting layers, problems have been encountered with respect to the coherency of the coatings, the porosity or local ineffectiveness of the coating, the mechanical instability of thick deposits, and the overall corrosion-inhibiting characteristics of the coating. Considerable effort has, therefore, been expanded in attempting to develop suitable corrosion-resistant coatings of the character described.

(3) OBJECTS OF THE INVENTION

It is an important object of the present invention to provide an improved method of protecting a metal surface against corrosion whereby the aforementioned disadvantages are obviated.

Another object of the invention is the provision of an improved corrosion-resistant coating for metal bodies.

Another object of the invention is to provide a metallic article of low corrodibility at low cost.

(4) SUMMARY OF THE INVENTION

These objects and others which will become apparent hereinafter are attained, in accordance with the present invention by prepicitating a corrosion-inhibiting substance upon a metal surface and bonding ionically this substance to an ion-exchange substance which forms, together with the corrosion-resistant substance, a three-dimensionally cross-linked stable coating free from the disadvantages of the coatings of the prior art. In other words, a three-dimensional cross-linked ion-exchange substance is, according to the invention, combined by ion-exchange bonding with an inorganic corrosion-inhibiting compound such that the effectveness of the latter is improved over the island-like localized adhesion of the inorganic compound which is precipitated upon the metal surface in part under the influence of local galvanic potentials. Where the corrosion-inhibiting substance is calcium carbonate (calcite), therefore, it is applied to the metal body in the usual manner and under the electrochemical effect of the local potentials mentioned earlier. However, this calcium carbonate coating is then stabilized and rendered more effective as a substantially homogeneous layer in spite of any original inhomogeneity of the metal surface, by treating the metal surface with a solution or suspension of anion-exchange substance, generally a zeolite, which is deposited by ion-exchange reaction with the calcium carbonate from the liquid vehicle. The resulting layer is thus a matrix of the ion-exchange substance which is held by the deposited salt and which, in turn, retains the salt homogeneously upon the metal surface, especially when the coating is thereupon hardened. The coating finally is a three-dimensionally cross-linked matrix of the ion-exchange substance in which the salt is retained and which is held by the salt onto the surface to which the ion-exchange substance may not normally be adherent.

At least in part, the ion-exchange substance is deposited upon the surface by an ion-exchange interaction with the previously deposited salt and simultaneously or subsequently the same ion-exchange effect retains the initially deposited salt in an adherent protective layer for the metal.

According to another feature of the invention, the inorganic precipitate is formed upon the metallic substrate at least in part by electrochemical or glavanic precipitation, using local differences in the surface potential of the metal workpiece. This has been found to provide a substantially greater adhesion of the inorganic component than is possible without electrochemical involvement in the precipitation step. Of course, the precipitation may be promoted by connecting an external source of electrical energy to the workpiece although we have found that this additional source is not generally required because the local surface potentials suffice. The liquid from which the precipitate is deposited, according to the invention, is preferably ordithe zeolitic substance with hexa o rmetapolyphosphate. In most municipalities and may be well water or watershed water. Such utility water or service water contains sufficient calcium to produce the precipitate of calcite which is desirable. It should be noted, however, that additional calcium may be supplied to the water and that the water can be distilled water into which a calcium salt has been introduced, although the latter techniques increase the cost of treatment.

The ion-exchange substance according to the present invention is a zeolite compound, i.e. a substance having zeolitic structure as this term is used in the art. In general, zeolites are dehydrated silicates of aluminum and sodium and/or calcium of the general formula $$Al_2O_2 \cdot nNa_2O \cdot mCaO/kSiO_2 \cdot xH_2O$$

where $n$, $m$ $k$ and $x$ are coefficients representing the molar proportions of the indicated components. The zeolites, which are used according to the present invention, may be the natural zeolites or the artificial zeolites although some ion-exchange resins may be used, preferably in conjunction with the mineral zeolite. The ion-exchange substance and the inorganic precipitate, as noted, form a coherent corrosion-inhibiting coating which is relatively stable but loose and is hardened by the minerals normally present in water. However, we have also found that it is possible to increase the effectiveness of this coating by combining the zeolitic substance with hexa or metapolyphosphate. In addition, we may add a dyestuff or pigment (generally described as coloring matter) to the compound, to the liquid from which the precipitate is deposited, or as a separate reagent applied to the coating to improve the appearance thereof. Among suitable pigments are those which may be described as paint pigments, e.g. titanium dioxide, zinc oxide and iron oxide, and organic dyestuffs capable of ionically bonding to the zeolite-containing coating.

(5) SPECIFIC EXAMPLE

A drawn tube of brass (Ms 70), of the type used in the refrigeration industry for the circulation of water, brine and other secondary heat-exchange fluids or for the circulation of primary heat exchange fluids such as refrigerants, is found to have various portions strongly oxidized while others are covered with a grease film and yet others remain unoxidized or uncoated. The pipe is immersed in utility water for a period sufficient to allow local galvanic action to deposit a calcium-carbonate coating of relatively high adhesion under the effect of the local potential differences at the surfaces of the body. To the water is added a colloidal zeolite suspension which may also include some polymerized styrene with divinyl benzene crosslinking agent but is mainly colloidal mineral zeolite at a pH and temperature such that the zeolite precipitates upon the deposit by ion exchange. The zeolite is bonded to the precipitate and thereby to the metal surface and forms with the precipitate a loose coherent three-dimensional film. The zeolite lattice tends to capture cations of water-hardness-producing chemicals and builds up a progressively more effective anticorrosion film. To increase the effect, we may add 1 to 10% by weight of alkali metal or other polyphosphates, especially hexapolyphosphate or metapolyphosphate. The use of the polyphosphates improves the adsorptive capacity of the coating. The pigments, e.g. iron oxide added in an amount of, say, 1 to 10% by weight of the salts in the colloidal suspension, provides an esthetic iron-oxide coloration when the natural or synthetic optically clear zeolites are used. The pigment can be finely divided iron ore added to the water suspension of the zeolites or to a mixture of components adapted to form the mineral zeolites from solution. These minerals may be those naturally occurring in iron ore or those used in iron metallurgy, or derived therefrom. Surprisingly, when iron oxide is used as the pigment, an increase in corrosion resistance is also obtained. The zeolitic suspension or solution, derived as described above and including the polyphosphate in utility water is employed to treat the brass tubing at a temperature between 40° and 80° C. and pH between 7 and 9 by passing the solution along the tube at a rate of 2 m./second. The corrosion-resistant film is formed within 1 hour and does not materially increase the resistance to heat transfer thereacross. When the coating is analyzed, it appears to contain substantially equal atomic proportions of calcium, phosphorus, aluminum and silicon.

We claim:

1. A metal body having a corrosion-resistant coating consisting essentially of a low-solubility calcium carbonate precipitate galvanically deposited on said body and an ion-exchange zeolitic substance forming a matrix for said precipitate and bonded thereto by ion exchange to provide a three-dimensional crosslinked corrosion-resistant coating with the precipitate.

2. The metal body defined in claim 1 which consists of brass wherein said ion-exchange substance is a natural or synthetic mineral zeolite.

3. A method of applying a corrosion-resistant coating to a metal surface, comprising the steps of precipitating upon said surface from solution a low-solubility calcium carbonate chemical compound; applying to said precipitate an ion-exchange zeolitic substance capable of ionic bonding to the precipitate whereby said substance is retained by said precipitate on said surface and forms an adherent corrosion resistant layer thereon.

4. The method defined in claim 3 wherein said low-solubility precipitate is deposited upon said metal surface at least in part by galvanic action resulting from different surface potentials at various locations along said surface.

5. The method defined in claim 4 wherein said low-solubility precipitate is deposited upon said surface from utility water.

6. The method defined in claim 5 wherein said substance of zeolitic structure is combined with a polyphosphate.

7. The method defined in claim 6, further comprising the step of introducing a pigment into said layer.

8. The method defined in claim 7 wherein said pigment is iron oxide.

9. A metal body having a corrosion-resistant coating consisting essentially of a low-solubility inorganic precipitate galvanically deposited on said body and an ion-exchange zeolitic substance forming a matrix for said inorganic precipitate and bonded thereto by ion exchange to provide a three-dimensional crosslinked corrosion-resistant coating with the precipitate, said precipitate being composed of a compound capable of ion-exchange reaction with said zeolitic substance and being retained thereby on said body while, in turn, retaining said zeolitic substance on said body.

10. A method of applying a corrosion-resistant coating to a metal surface, comprising the steps of precipitating upon said surface from solution a low-solubility inorganic chemical compound; applying to said precipitate an ion-exchange zeolitic substance capable of ionic bonding to the precipitate whereby said substance is retained by said precipitate on said surface and forms an adherent corrosion resistant layer thereon, said precipitate being composed of a compound capable of ion-exchange reaction with said zeolitic substance and being retained thereby on said body while, in turn, retaining said zeolitic substance on said body.

References Cited

UNITED STATES PATENTS

| | | | |
|---|---|---|---|
| 1,996,747 | 4/1935 | Butterworth | 117—127 X |
| 2,299,748 | 10/1942 | Hatch | 117—97 |
| 2,337,856 | 12/1943 | Rice et al. | 117—127 X |
| 2,977,313 | 3/1961 | Roland | 21—2.7 R X |
| 3,009,872 | 11/1961 | Snell et al. | 21—2.7 R X |
| 3,338,670 | 8/1967 | Fuchs | 21—2.7 R X |
| 3,520,813 | 7/1070 | Hansen et al. | 21—2.7 R X |
| 3,640,759 | 2/1972 | Primus et al. | 117—127 X |

FOREIGN PATENTS

| | | | |
|---|---|---|---|
| 365,628 | 1/1932 | Great Britain | 117—97 |
| 440,508 | 1/1936 | Great Britain | 117—97 |

RALPH S. KENDALL, Primary Examiner

U.S. Cl. X.R.

117—135.1